United States Patent [19]
Cherry

[11] 3,928,512
[45] Dec. 23, 1975

[54] BIO POND AERATOR

[76] Inventor: Kenneth Floyd Cherry, 4406 Suder Ave., Toledo, Ohio 43611

[22] Filed: Mar. 4, 1974

[21] Appl. No.: 447,895

[52] U.S. Cl. .................................. 261/91; 261/120
[51] Int. Cl.² .......................................... B01F 3/04
[58] Field of Search ............. 261/91, 120, 87, 113; 210/242

[56] References Cited
UNITED STATES PATENTS

| | | | |
|---|---|---|---|
| 3,218,042 | 11/1965 | Ciabattari et al. | 261/120 X |
| 3,512,762 | 5/1970 | Umbricht | 261/87 |
| 3,515,377 | 6/1970 | Ray | 261/91 X |
| 3,524,629 | 8/1970 | Culwell | 261/91 X |
| 3,669,422 | 6/1972 | Nogaj | 261/91 X |
| 3,680,845 | 8/1972 | Carlsmith et al. | 261/91 X |
| 3,735,926 | 5/1973 | Ravitts | 261/91 X |
| 3,785,558 | 1/1974 | Albritton et al. | 261/120 X |
| 3,797,809 | 3/1974 | Sydnor, Jr. | 261/120 X |
| 3,811,662 | 5/1974 | Kaelin | 261/91 |

*Primary Examiner*—Tim R. Miles
*Assistant Examiner*—Richard L. Chiesa
*Attorney, Agent, or Firm*—Kenneth F. Cherry

[57] ABSTRACT

This invention relates to a Biological pond aeration device for the purpose of water or waste water treatment. More particularly the invention is an aeration device which raises liquid from the lower section of a pond, then allows the liquid, by gravity, to pass over and through a channel suspended above the pond's surface.

3 Claims, 2 Drawing Figures

BIO POND AERATOR

Present aerator technology using surface mechanical, venturi or pump type units is well known. See "Process Design Manual for Upgrading Existing Wastewater treatment Plants" U.S. Environmental Protection Agency by Roy R. Weston Inc. Program No. 179090 GNQ Contract No. 14-12-933. October 1973, section 8.

Present aeration units require high energy input to pump air to the bottom of the pond, or raise the liquid to substantial heights, or spray the water great distances; or some combination of the above.

It is an object of the present invention to provide a novel aeration device which can be used in conjunction with conventional water and waste water treatment facilities.

It is further an object of this invention to provide both mixing and aeration.

In order that the invention may be more clearly understood, reference is made to the accompanying drawing, wherein.

Figure 1:
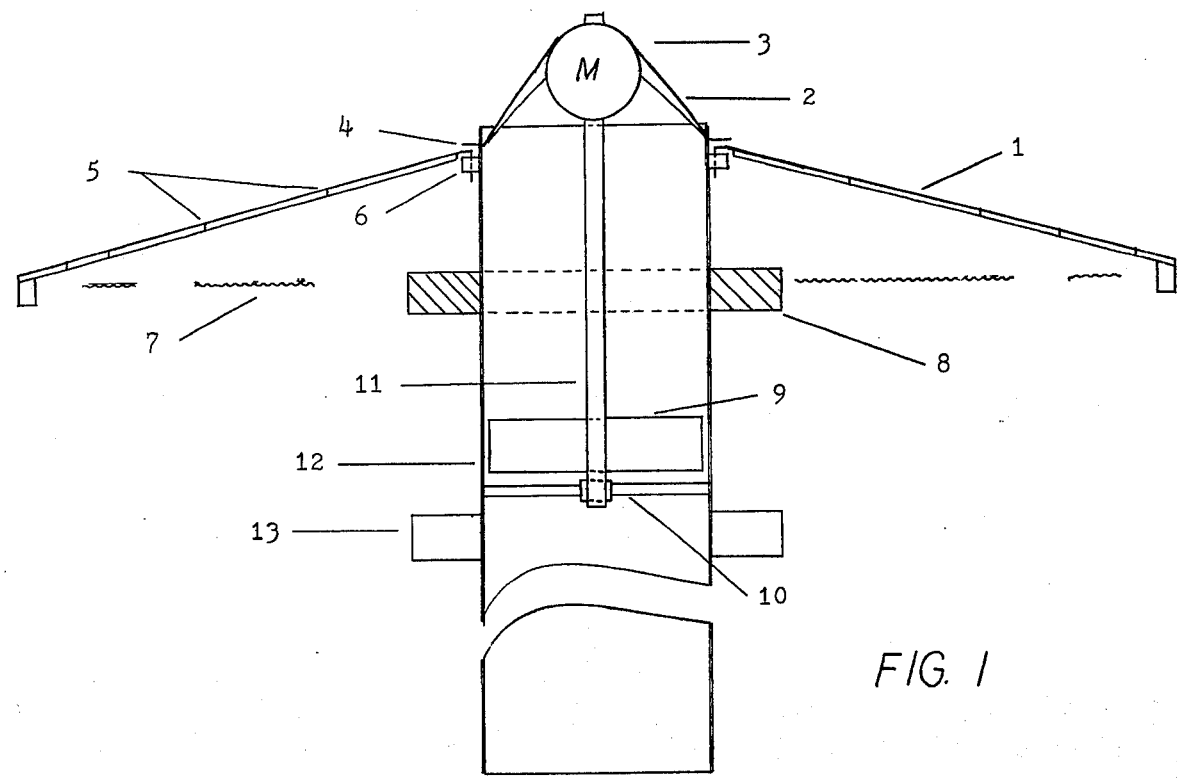
FIG. 1 is a front section view.
Figure 2:
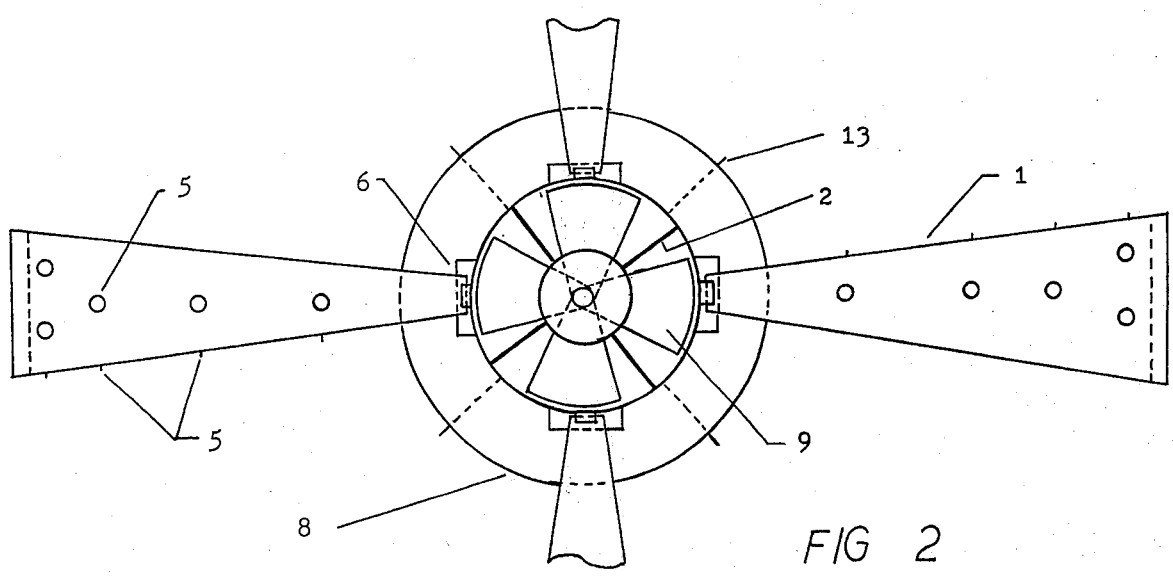
FIG. 2 is a top view, the shaft brace 10 of FIG. 1 being omitted.

Referring to the various figures of the drawing 12 here after referred to as the tube is a tube extending from above the liquid surface 7 to a predetermined depth below said surface. Fitted in said tube a propeller-like device 9 hereafter referred to as the impeller, said impeller on a shaft 11, connected to a motor 3. The motor is rigidly attached to said tube by suitable braces 2 and said shaft is braced as necessary by conventional braces 10 to allow smooth operation of said impeller. Around said tube a float ring 8 is attached, said float ring of sufficient buoyancy to float the entire device and the effective weight of the liquid in the tube while operating. In the upper portion of said tubular section above said float ring, overflow weirs 4 are positioned to allow the liquid raised by said impellor to flow over said weirs onto the aerator arms.

Below said weirs, bracket assemblies 6 are constructed so as to provide a connecting support between said tube and aerator arms 1. The aerator arms are provided with a float on one end and a mechanical hinge attachment fitted to said bracket assembly to provide a sturdy connection to said tube while allowing movement of said aerator arms on said bracket assembly and further allowing removal of said aerator arm, from said tube. The aforesaid aerator arms constructed in a general channel shape and providing controlled spillage of liquid by means of holes in the lower surface of said aerator arms. Attached to said tube below said liquid level two or more paddle-like structures 13 designed to promote mixing which also may be mounted so as to provide lift as said tube rotates.

Operation of the device is as follows:

Turning of said impeller by said motor raises the liquid in the tube to the weir height, this turning imparts a torque to said tube causing it to spin and mix the liquid by means of the said paddle-like structures. This same torque also causes the said attached arms to move in a circular path over the surface of said liquid. As all the liquid raised by said impellor flows over said weirs onto said aerator arms it is pulled by gravity toward the float end of said arm. Holes in said aerator arm's lower surface allow the flowing liquid to fall and thereby impact upon the liquid surface resulting in aeration. Length of said tube can either be designed for a fixed depth pond or made telescoping for application with varying depth. Further biological treatment can be enhanced by providing pie shaped aerator arms to maximize surface area in conjunction with a roughened surface, or plastic media type surface conducive to biological growth. Additional control of the rotation speed of said tube can be provided by employing the moment generated to allow the liquid to exit from only one side of each arm as is common practice in many trickling filter units.

In those applications where a non-rotating unit is desired the float ring may be eliminated and a fixed structure substituted to support the unit and mounted in a conventional manner on structures as used to support present mechanical surface aerators.

In those applications where conventional pumps are considered economical, a unit, either rotating or stationary, as described herein, and receiving liquid to the arms by means of a motor, pump, and manifold type distribution system in lieu of the motor shaft, and weir combination may be used. Both of the above stated modifications use the same principle as the illustrated unit, that is, pumping of the liquid from the lower sections of a pond, then allowing gravity to cause the liquid to flow over and through channel like members and impact on a pond's surface. The primary mixing force in the above variations is the currents caused by the liquid being pumped from the lower sections and placed on the surface and thereby creating general circulation of the liquid.

Having described the invention I claim:

1. An aeration device adapted for positioning on a liquid pond for the purpose of transferring oxygen from the atmosphere to the liquid comprising a central tubular section and mounted externally thereon a buoyant means consisting of a float ring with buoyancy sufficient to support the entire structure while in operation, motor, shaft, and impeller combination with said impeller positioned inside said tubular section below said float ring and attached by said shaft to said motor, said motor mounted on and supported by said tubular section so as to impart the torque generated by turning said impeller inside said tubular section to said tubular section, said motor shaft and impeller combination sized and positioned to raise said liquid within said tubular section, at least two liquid overflow weirs positioned in said tubular section above said float ring to allow said raised liquid to flow over said weirs and out of said tubular section, bracket assemblies mounted below each said liquid overflow weirs externally on said tubular section between said float ring and said liquid overflow weirs, aerator arms of a channel shape with a float on one end and a hinge structure on the other end, said hinge structure compatible with said bracket assemblies for attachment of one aerator arm below each said overflow weir, said aerator arms positioned during operation so that the end with a float is below the hinged end and said liquid flowing over said overflow weirs onto said aerator arms will flow toward the float end, holes in the lower surface of said aerator arms to allow portions of said liquid to flow through said holes and impact on the surface of said liquid pond, causing aeration to said liquid pond and the general flow of said liquid through said aeration device resulting in general movement and circulation of said liquid pond.

2. The combination according to claim 1 wherein said tubular section is of telescoping construction to permit drawing of said fluid from varying depths below said surface of the liquid pond.

3. The combination according to claim 1 wherein the surface of said aerator arm has a roughened plastic media type surface conducive to biological growth.

* * * * *